C. J. COOKE.
TESTING DEVICE FOR MOTOR VEHICLES.
APPLICATION FILED DEC. 20, 1911.

1,064,615.

Patented June 10, 1913.

2 SHEETS—SHEET 2.

Witnesses
Wm L Mulligan
C Edwoustonjr

Inventor
C. J. Cooke
By Victor J. Evans
Attorney

UNITED STATES PATENT OFFICE.

CHARLES JOHN COOKE, OF ALBANY, NEW YORK.

TESTING DEVICE FOR MOTOR-VEHICLES.

1,064,615.  Specification of Letters Patent.  Patented June 10, 1913.

Application filed December 20, 1911. Serial No. 666,935.

*To all whom it may concern:*

Be it known that I, CHARLES J. COOKE, a citizen of Great Britain, residing at Albany, in the county of Albany and State of New York, have invented new and useful Improvements in Testing Devices for Motor-Vehicles, of which the following is a specification.

This invention relates to testing devices and more particularly to devices for testing motor vehicles.

The object of the invention is to provide a simple and efficient device of this character whereby the capacity of the vehicle may be properly tested as to its efficiency for hill climbing, for braking or drown grades, and other essential tests which have been heretofore carried out on the road.

A further object of the invention is to provide a testing machine which includes an endless belt or movable track which may be shifted so that its inclination may be made to assimulate inclines or down grades and is of such width as to permit the car being properly steered from side to side so that the power and braking capacity of the car may be tested and also its steering gear.

A still further object of the invention is to provide a testing device of this character whereby the power developed for driving the vehicle may be utilized in a useful manner, as by operating a dynamo pump or the like to charge storage batteries or to fill an air tank.

A still further object of the invention is the provision of suitable means for steering the vehicle while on the testing machine without making it necessary for the operator to be upon the vehicle so that all liability of danger is thus eliminated.

Further objects of the invention will appear as the following specific description is read in connection with the accompanying drawings, which form a part of this application, and in which:—

Figure 1:
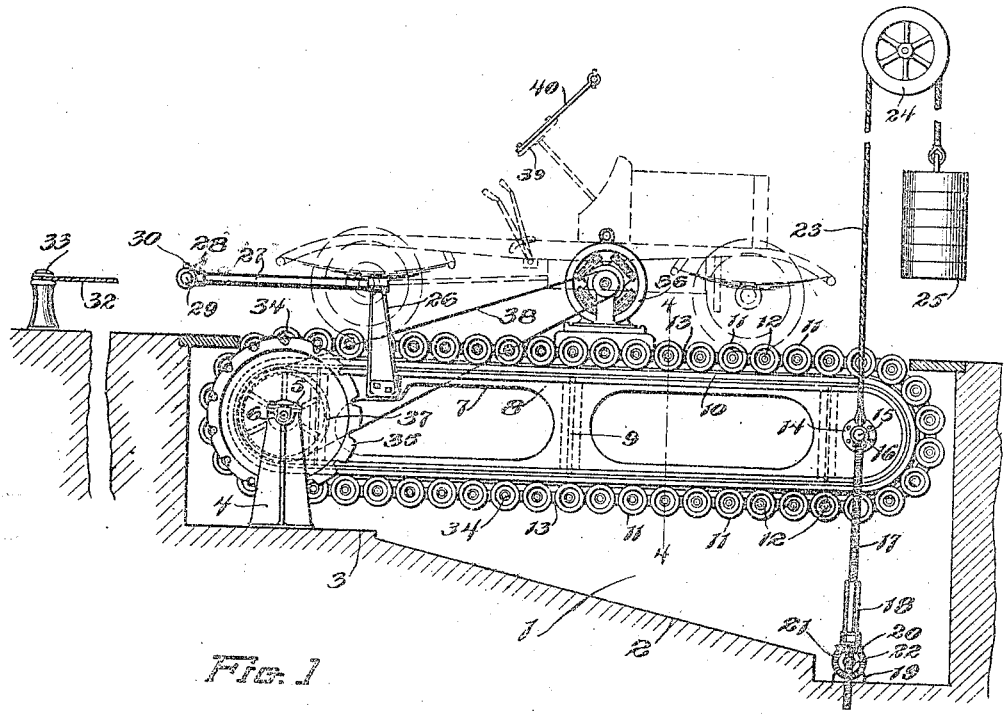
Figure 2:
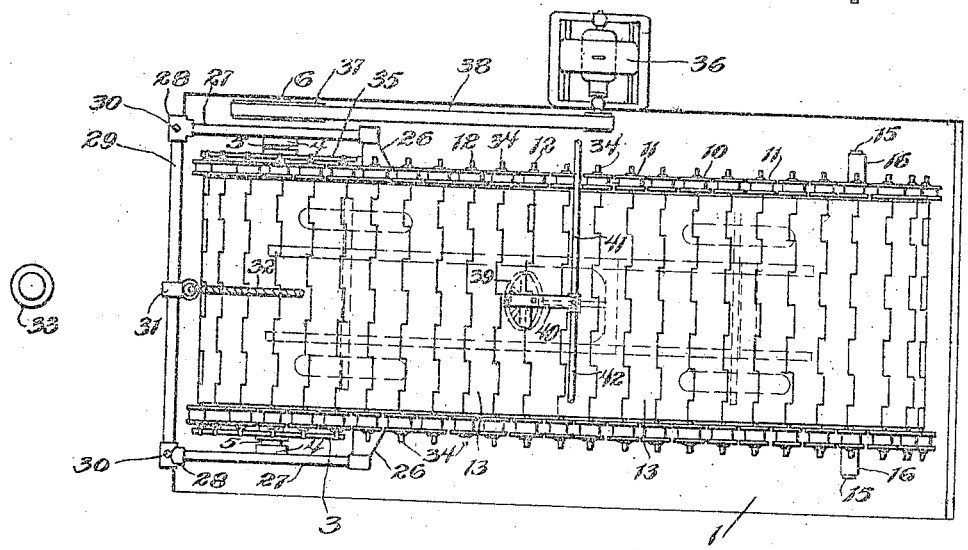
Figure 3:
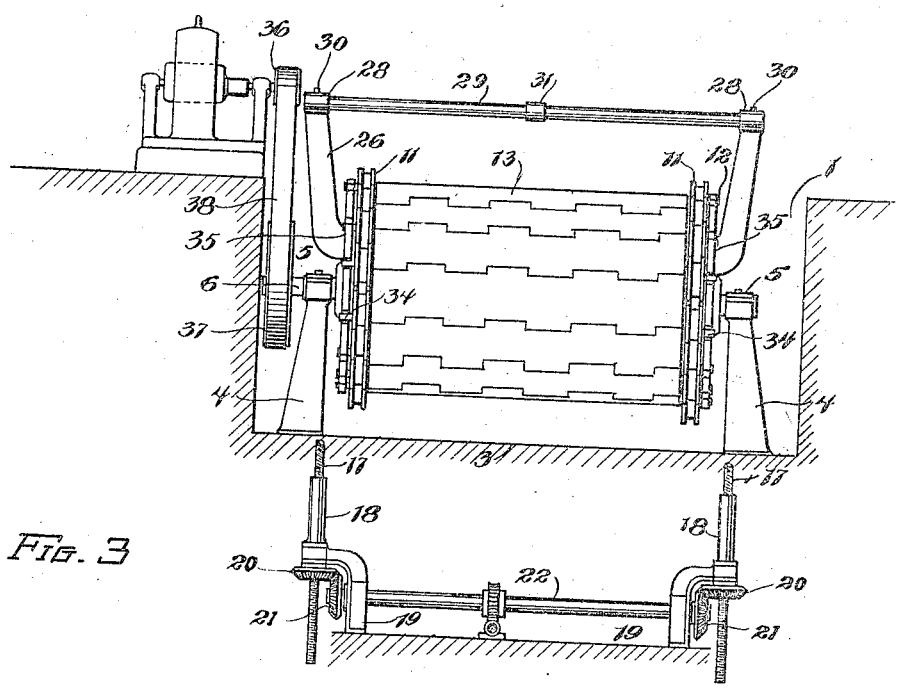
Figure 4:
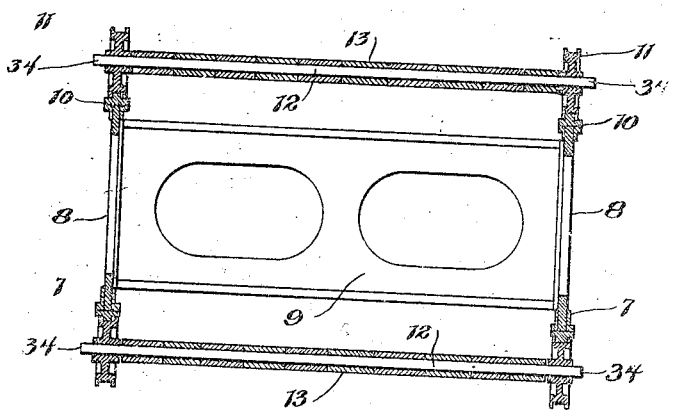

Figure 1 is a side elevation. Fig. 2 is a top plan view. Fig. 3 is an end elevation. Fig. 4 is a section on the line 4—4 of Fig. 1.

In the specific embodiment of the invention as illustrated herein, 1 represents a pit or depression formed in the floor or other surface and having an inclined bottom 2 for a purpose to be hereinafter described. Adjacent one end of the bottom 2, there are mounted upon a level portion 3 thereof suitable bearing standards 4 which have mounted in bearings 5 in their upper ends a transverse shaft 6 upon which one end of a suitable frame 7 is loosely mounted. This frame comprises skeleton side members 8 which are connected together by the bridge pieces 9. Each side member is substantially oval in outline and carries an oval track 10 thereon over which is adapted to travel a plurality of wheels 11 connected together through the pintles 12 upon which they are journaled, of the platform sections 13. These platform sections are hinged together by the pintles 12, as shown, and are supported by the wheels upon the tracks so as to constitute an endless belt upon which the automobile or other motor vehicle is adapted to rest during the testing operation.

The sides 8 of the frame have secured thereon adjacent the free end thereof suitable plates 14 from which project stub shafts 15 having loosely journaled thereon bearing members 16. The lower ends of the bearing members are connected to screws 17 which have threaded thereon sleeves 18 journaled in bracket bearings 19. The lower ends of these sleeves carry beveled gears 20 which mesh with similar gears 21 upon a transverse shaft 22 which is operated in any suitable manner to rotate the beveled gears 20 and thus raise or lower the screws in the sleeves 18. The bearing portion of the bracket which holds the sleeves 18 is preferably pivoted to the bracket proper so as to permit the screw to assume different angles governed by the position of the free end of the frame in its movements up and down. In order to balance the weight of the same upon the screws, a cable 23 is connected to the bearing 16 and passes over a pulley 24 and has its free end suitably weighted, as shown at 25, the weights being preferably removable so as to make the balance device adjustable.

Extending upwardly from the side plates 8 are standards 26 in the upper ends of which are secured rearwardly extending supporting members 27 having bearings 28 at their rear ends. Removably mounted in these bearings is a bar 29 which is held in rigid position therein by set screws 30. This bar has slidably mounted thereon a ring member 31 to which a cable 32 is attached, the opposite end of the cable being connected to any suitable portion of the automobile or other motor vehicle so that when in operation, the same will be prevented from traveling forward over the frame. When the bar 29 is not in use, a bollard 33 secured to the floor is preferably used. When the machine is connected to the slidable ring 31 through the cable 32 and is steered from right to left on the moving platform, the ring will slide upon the rod 29 so that a straight cable will always connect the machine and bar and no lateral strain will be placed upon the vehicle.

In order that the power journaled in operating the testing machine may be used to be utilized, the pintles or hinging rods 12 of the platform sections are extended into sprocket engaging pintles 34 which engage the sprocket wheels 35 keyed to the shaft 6. In this manner, the shaft 6 is driven and its rotation is communicated to a dynamo 36, by a pulley 37 and a belt 38.

In order that the operator may not be compelled to stand or sit upon the vehicle while testing, there is secured to the steering wheel 39 of the vehicle, a lever or arm 40 to which are pivotally connected rods or cables 41 and 42 which when operated will turn the wheel 39 in the required direction and steer the vehicle to either side of the platform. The throttle lever may be controlled in a similar manner.

It will be understood from the foregoing that by elevating or depressing the free end of the frame by proper manipulation of the screws, the platform may be made to assimulate an incline or a down grade and when the machine is in motion and anchored against travel over the frame, the platform will be driven in a retrograde direction and the dynamo will be operated to generate electricity.

What I claim as new is:—

1. The combination with a steerable motor vehicle, of a movable supporting platform therefor, a stationary member, and a flexible connection between the stationary member and the vehicle which is adapted to slide over the stationary member as the vehicle is steered from side to side of the platform.

2. The combination with a steerable motor vehicle, of a movable supporting platform therefor, a stationary member, and a connection between the stationary member and the vehicle which is adapted to slide over the stationary member as the vehicle is steered from side to side of the platform.

In testimony whereof I affix my signature in presence of two witnesses.

CHARLES JOHN COOKE.

Witnesses:
 JOHN F. VAN GOOSBECK, Jr.,
 TALMON CANIER.